(12) United States Patent
Brailovskiy et al.

(10) Patent No.: US 9,607,366 B1
(45) Date of Patent: Mar. 28, 2017

(54) CONTEXTUAL HDR DETERMINATION

(71) Applicant: Amazon Technologies, Inc., Seattle, WA (US)

(72) Inventors: Ilya Vladimirovich Brailovskiy, Mountain View, CA (US); Igor Aleksandrovich Tryndin, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 286 days.

(21) Appl. No.: 14/576,770

(22) Filed: Dec. 19, 2014

(51) Int. Cl.
*G06K 9/62* (2006.01)
*G06T 5/00* (2006.01)
*G06K 9/46* (2006.01)

(52) U.S. Cl.
CPC ............ *G06T 5/009* (2013.01); *G06K 9/4647* (2013.01); *G06K 9/6262* (2013.01); *G06T 2207/10004* (2013.01); *G06T 2207/20081* (2013.01); *G06T 2207/20208* (2013.01)

(58) Field of Classification Search
None
See application file for complete search history.

(56) References Cited

U.S. PATENT DOCUMENTS

| 2009/0317017 | A1* | 12/2009 | Au | G06T 5/008 382/274 |
| 2010/0150403 | A1* | 6/2010 | Cavallaro | G06K 9/00778 382/107 |
| 2012/0002082 | A1* | 1/2012 | Johnson | G06T 5/50 348/234 |
| 2014/0022460 | A1* | 1/2014 | Li | G06T 5/009 348/708 |
| 2014/0232614 | A1* | 8/2014 | Kunkel | H04N 9/67 345/1.1 |

* cited by examiner

*Primary Examiner* — Vikkram Bali
(74) *Attorney, Agent, or Firm* — Seyfarth Shaw LLP; Ilan N. Barzilay

(57) ABSTRACT

A system uses machine learning techniques to train models for determining whether to activate high dynamic range (HDR) imaging in devices. The system may train machine learning components/models based on customized image metrics (such as customized histograms) that can be used across devices. The system may also train HDR systems on non-image data like GPS data, etc. to make improved HDR recommendations based on the context of a particular image.

20 Claims, 13 Drawing Sheets

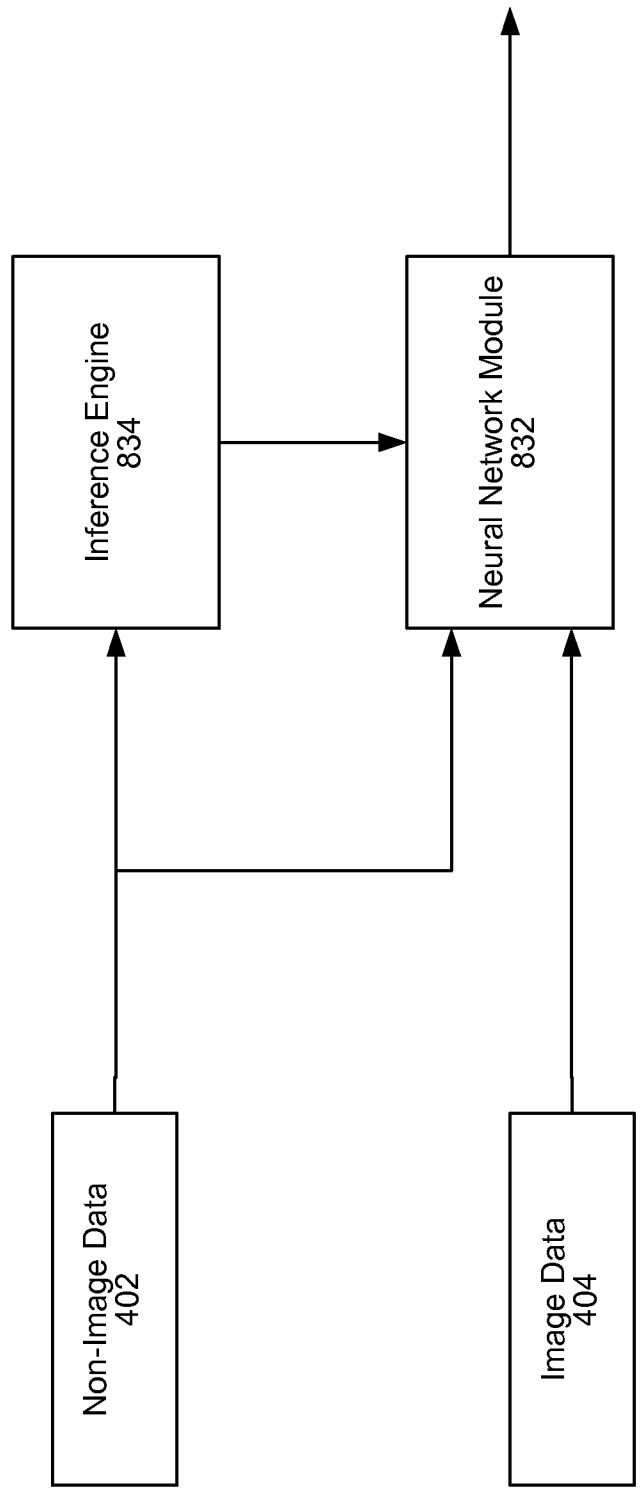

CONTEXTUAL HDR DETERMINATION

BACKGROUND

Mobile electronic devices such as tablet computers and smart phones commonly include cameras. The cameras may be used to record images for pictures, videos or other applications under a variety of different lighting conditions.

BRIEF DESCRIPTION OF DRAWINGS

For a more complete understanding of the present disclosure, reference is now made to the following description taken in conjunction with the accompanying drawings.

FIG. 4 illustrates a configuration of machine learning components according to embodiments of the present disclosure.

DETAILED DESCRIPTION

Figure 1:
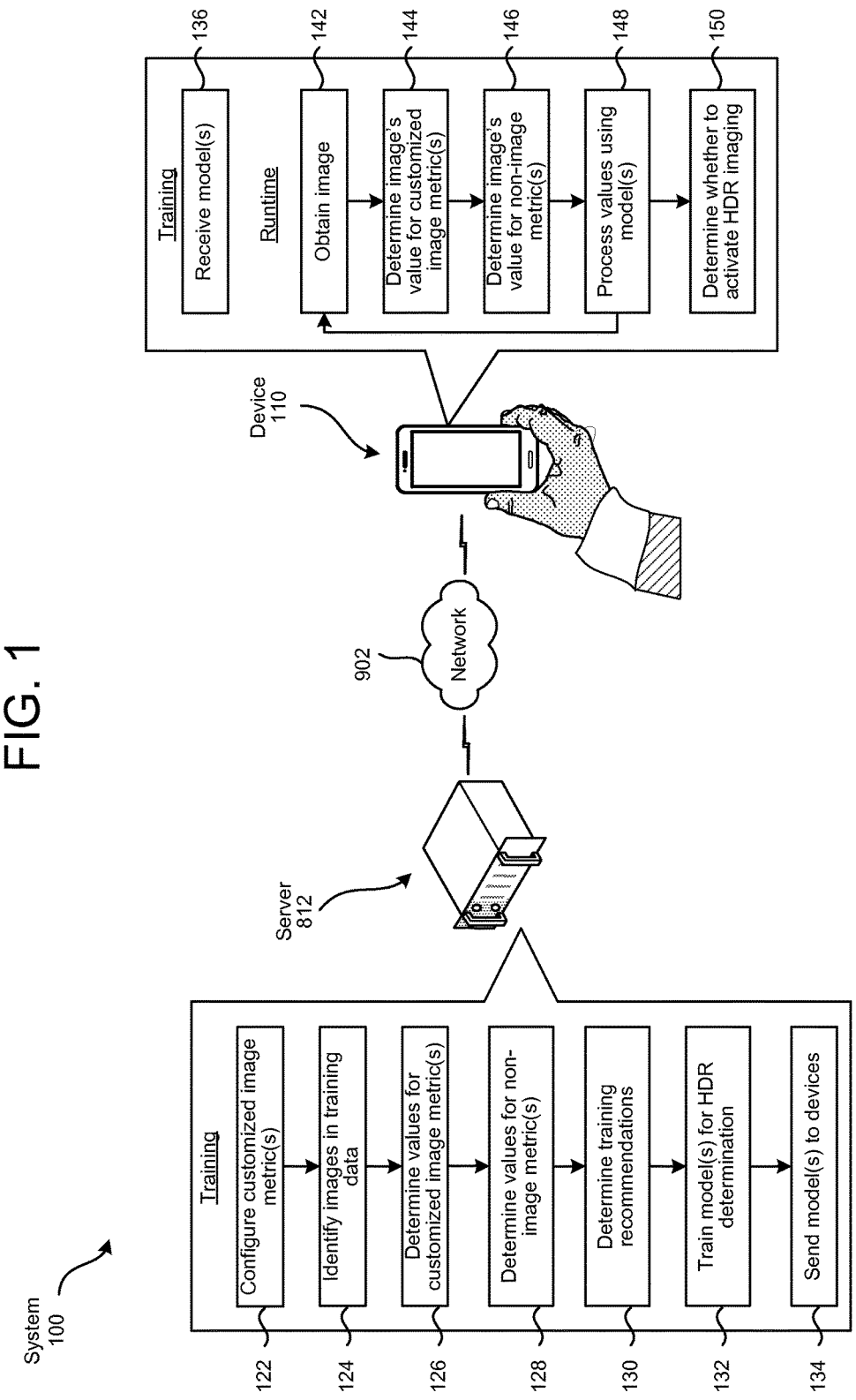
FIG. 1 illustrates a system for training and running machine learning components to make high dynamic range (HDR) imaging determinations.

Devices such as mobile phones, tablets, etc. frequently include cameras that are capable of capturing video data under varying lighting conditions. A photo that includes different lighting levels, for example a photo showing a bright sun and a dark shadow in a single view, is said to have a high scene illumination range, also called high dynamic range (HDR). Due to typical limitations in capturing images with high dynamic range in modern image sensors, it is difficult for devices to capture a wide range of image details that exist in an original HDR scene. As a result, an image taken from a device may result in oversaturated (overexposed) portions, underexposed, etc. HDR imaging technology can assist in overcoming these limitations by capturing all tonal range of the original scene from shadows, midtones and highlights and combining the captured data into a more desirable image.

When capturing video data with a device (such as when taking still pictures, videos, or otherwise operating an application that relies on video data from a device camera), it may not be apparent when a user should activate an HDR imaging mode for a device. Thus a number of different devices include capabilities to determine when to activate an HDR imaging mode. When a device detects that an HDR imaging mode should be activated, the device may indicate to the user to turn on the HDR imaging or the device may turn on HDR imaging without waiting for a user command. Detecting whether HDR imaging should be activating may be referred to as automatic scene detection (ASD). ASD algorithms typically depend on different image data/metrics, such as histograms (described below), calculated by different components of the device. If the image metrics have certain values, the ASD algorithm will indicate that HDR imaging should be activated.

One problem with this approach is that each device, and in particular each model of processor/chip set of a device, may include hardware of a specific hardware configuration type, and thus be configured to calculate different image metrics from other hardware configuration types. This means that ASD operation of one device may be very different from the ASD operation of another device, leading to inconsistent HDR operation and resulting inconsistent image quality across devices. Such differences may exist across generations of the same device (due to different components) as well across different models of a similarly branded device (one size tablet may have a different ASD operation from another size of the same branded tablet, again due to different components). These differences and inconsistencies may result in a frustrating and undesirable user experience when capturing images under varying light conditions.

Offered is an improved method and system for performing ASD operations and for determining when HDR imaging should be activated. As described below, aspects of the improvement include one or more customized image metrics that measure qualities of the image captured by camera(s) of the device. The customized metric(s) is configured to be calculable by different devices with different hardware configurations. Further, machine learning techniques may be applied to training data labeled with values for the customized metric(s), allowing model(s) to be generated that can be used for ASD operations to indicate when HDR imaging should be activated. The model(s) may be distributed to individual devices to use at runtime. The model(s) allow the individual devices to calculate values for the customized metric(s) for images in the device's image feed, apply the model(s), and determine whether HDR imaging should be activated.

Further, aspects of the improvement include using non-image metrics to determine whether HDR imaging should be activated. As noted above, typical ASD operations are based on image metrics, that is, metrics that are calculated based on the image taken by the camera(s) of the device. Other non-image metrics such as location of the device, device orientation, time of day, etc. may be used for ASD operations. Values for such non-image metrics may be taken from other sensors of a device (GPS, clock, etc.) or from other sources. Training data may also be labeled with values for these non-image metrics, thus allowing model(s) to be generated that can be used for ASD operations. Such models may be stand-alone models or may be the customized metric(s) model(s) configured to also account for the non-image metrics. Thus, more data may be considered when devices determine whether HDR imaging should be activated. Upon a determination that HDR imaging should be activated, a device may activate HDR imaging or may activate an indicator that HDR imaging should be activated (such as flashing an LED, showing an icon on a display, vibrating the device, emitting an audio indicator, etc.).

As shown in FIG. 1, a system 100 may include a server 812 connected over a network 902 to a device 110. The operation of the system 100 is illustrated at two different times, namely at training (for example when the system trains models for HDR determinations and distributes them to devices) and at runtime (for example when individual devices detect whether captured images should be processed with HDR imaging). Although training and runtime may occur at various different stages, training by the server 812 may happen at a first time, distribution of the model to a device may happen at a second later time (for example, upon construction of a device or updating of its hardware/software), and runtime may happen at a still later third time.

As shown in FIG. 1, a server 812 may configure (122) a customized image metric(s) that may be used to characterize an image. As explained below, the customized image metric may be one that is configured to be quickly calculable using individual device image metric values, such as particular histogram values for certain hardware configuration types. The system may also identify (124) images in a training data set and may also determine (126) values for the customized image metric(s) for the images in the training data. The system may also determine (128) values for non-image metrics for the training images. The system may also determine (130) training recommendations for the training images (for example, "yes" for HDR processing or "no" for HDR processing for each individual image. The system may then train (132) a machine learning model(s) for determining whether to apply HDR imaging on an individual image and send (134) that model(s) to different devices. The model(s) may be configured to work with different devices configured to calculate different image statistics, as explained herein. The model(s) may also be configured to operate on data from individual device's sensors, such as gyroscopes, accelerometers, or other devices that output data corresponding to the non-image metric(s) that the model(s) are trained on. Individual devices, such as device 110, may receive (136) the model(s).

At runtime, a device 110 may obtain (142) an image, for example through a feed of a camera of the device 110. The device may determine (144) a value of the customized image metric(s) for the obtained image. The device may be able to do so using its own hardware configuration type, as the device's specific hardware configuration type may have been considered when configuring (122) the customized image metric(s) by the system 100. The device 110 may also determine value(s) for non-image metric(s) that correspond to the obtained image. For example, the device 110 may receive outputs from different device sensors that describe the context in which the image was taken (such as device location, direction facing by the camera, movement data, or the like). The device 110 may then process (148) the various collected data by the model(s) and determine (150) whether to activate HDR imaging based on the processing. The determination whether to activate HDR imaging may also be based on the processing of multiple different images taken from an image feed. For example, several images from the feed may be processed in quick succession, and the metric values for the different images considered together (or separately) by the system to make the determination on HDR imaging. Accordingly, the device may repeat steps 142-148 prior to the determining step 150.

Further details of the system are described below.

As noted above, machine learning techniques may be applied to improve device operations to determine HDR imaging should be activated. Various machine learning techniques may be used for this purpose including neural networks, inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, an image classifier, requires establishing a "ground truth." In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. For purposes of training an image classifier to determine whether a particular image, such as an image from a device's camera image feed, should be processed using HDR imaging, many examples of images must first be processed to train the image classifier. Each of these images may be associated with image data, such as the image itself, as well as values for image metrics that describe the image. The image metrics may include, for example histograms or other statistics. As part of the training data each image is also given a value (such as true or false) for whether the image is a candidate for HDR imaging. Thousands of such training images may be used when training a machine learning component. The result of such training may be one or more models that may be distributed to devices to use at run-time to quickly analyze whether a new image should be subject to HDR imaging. The individual devices then compare an incoming image to the model to determine whether the incoming image should be subject to HDR imaging. That determination may be a binary determination (yes or no) or may be a scored determination, indicating a numerical value (such as a confidence score) representing a likelihood that the incoming image should be subject to HDR imaging.

As can be appreciated, the models determine for machine learning based processing of images depend on the image metrics used to analyze each image. That is, the machine learning components analyze the values of the image metrics for each image to make a decision regarding HDR imaging. Thus, in certain respects, each model is "customized" for the particular kinds of image metrics it is trained to recognize and process. This means that in order for a device to make use of a machine learning model, the device must be capable of generating values for the image metrics the model uses. As noted above, however, different devices/processors may be configured to generate different image metrics that may not be the same as image metrics generated by other devices/processors. Thus machine learning models that may be configured for one device may not necessarily work with another device.

To counter this problem, machine learning model(s) may be generated using one or more customized image metric(s).

The customized image metric(s) may be configured so that individual devices of different hardware configuration types, may still be able to calculate values for the customized image metric(s) using their own individual hardware. Each image in the training set may be associated with a value for the customized image metric(s) and the machine learning components may be trained with the customized image metric(s) to generate the model(s). The model(s) are then distributed to devices (such as during device construction, firmware/software updates, etc.). At runtime, devices of different hardware configuration types may calculate value(s) for the customized image metric(s) and process those values using the model(s) to make HDR decisions.

To allow for increased usability of the customized image metric(s), the customized image metric(s) may be a numerical representation of an image that is based on image metrics calculable using image metric(s) from one or more different hardware configuration types. For example, the customize image metric(s) may be a customized histogram that describes a histogram pixel shape of an image, where the size of the customized histogram pixel shape is determined based on different histogram pixel shape sizes and/or different measured pixel characteristics used by devices of different hardware configuration types. Although various different image metrics may be used with the present disclosure, the example of histograms is explored below for purposes of illustration.

Figure 2:
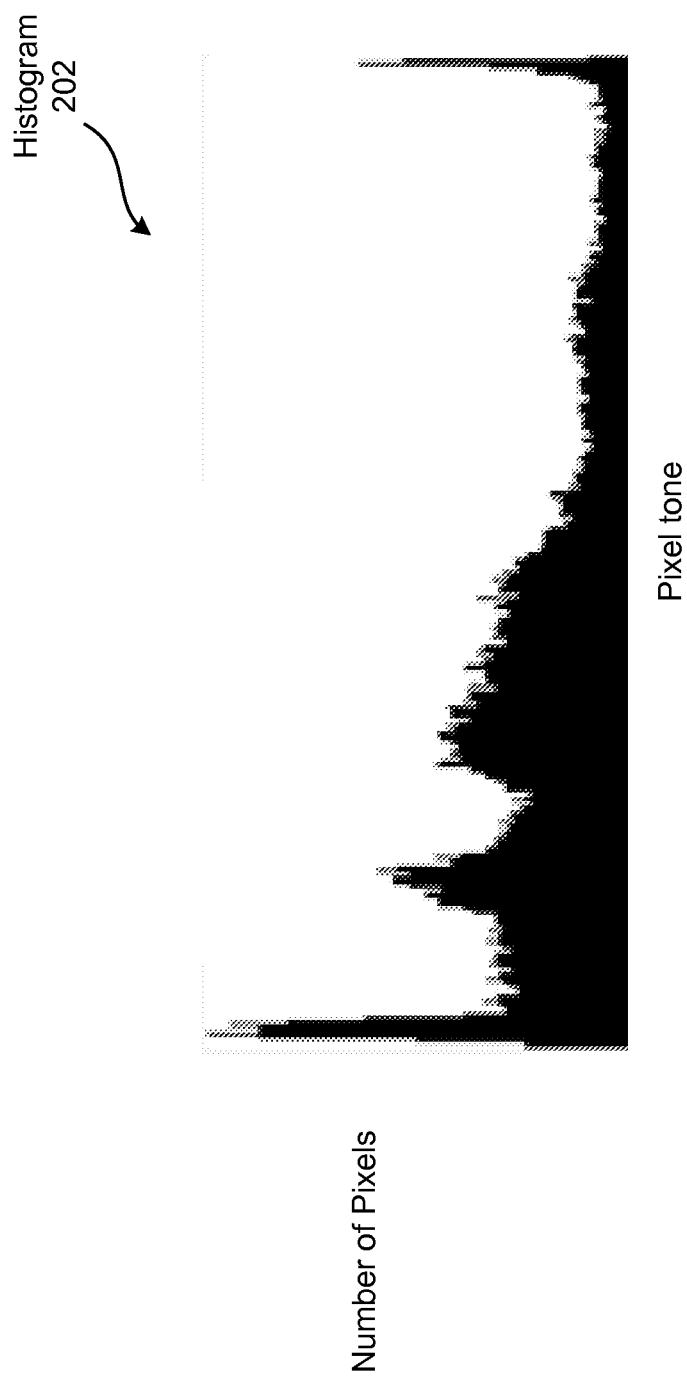
FIG. 2 illustrates an example histogram.

As noted, different hardware configuration types may be configured to generate values for different default image metrics, such as histograms for differently sized histogram pixel shapes. An image histogram is a representation of the image data of a particular image. For example, a histogram may represent the number of pixels an image has for each tonal variation of the pixel (i.e., color, brightness, etc.). An example histogram is shown in FIG. 2, where the figure shows histogram 202. The histogram charts the number of pixels on the Y axis along with the different pixel tones on the X axis. A histogram may be calculated for an image, or may be calculated for particular regions of an image. The particular region in which pixels are analyzed for the histogram may be referred to as the histogram pixel shape.

If different devices are configured use different sized histogram pixel shapes (such as due to their respective hardware configurations), it is difficult to take a machine learning model trained to make HDR decisions using histograms of one sized histogram pixel shape and send it to a device that uses histograms of a different histogram pixel shape. The models won't work properly with the device that uses histograms of the different histogram pixel shape, and will thus lead to inaccurate HDR decision results.

To counteract that problem, a customized histogram may be configured where the histogram pixel shape of the customized histogram is chosen relative to the dimensions of histogram pixel shapes that are used by different hardware configuration types. For example, a first image processing hardware chipset manufactured by a first manufacturer may be configured to calculate a histogram based on an image region that has dimensions of N pixels high and M pixels wide. Thus, a first histogram pixel shape of N×M may correspond to a first hardware configuration type. A second image processing hardware chipset manufactured by a second manufacturer may be configured to calculate a histogram based on an image region that has dimensions of Y pixels high and X pixels wide. Thus, a second histogram pixel shape of Y×X may correspond to a second hardware configuration type. A customized image metric may be configured based on the first histogram pixel shape and the second histogram pixel shape, where the customized image metric may be a customized histogram with a histogram pixel shape that is N×Y pixels high and M×X pixels wide. Thus the dimensions of the customized histogram pixel shape is determined by multiplying the dimensions of the first histogram pixel shape by the second histogram pixel shape. Values for the customized histogram based on pixels within the customized histogram pixel shape may then be determined for the training images in the training set. The training images (and their respective customized histogram values) may then be used to train the machine learning systems. The models that result may thus depend on values for the customized histogram.

At runtime an individual device may thus calculate values for the customized histogram for an image taken by the device. The device may determine values for the customized histogram using values for the specific histogram the device is configured to calculate based on its hardware configuration type. For example, a first device of the first hardware configuration type may aggregate Y of its own histograms high and X of its own histograms across to obtain data for an N×Y high and M×Y wide customized histogram value. Similarly, a second device of the second hardware configuration type may aggregate N of its own histograms high and M of its own histograms across to obtain data for an N×Y high and M×Y wide customized histogram value. Thus, each device may have its own transform to convert its native default histogram values into values for the customized histogram. In this example the first device would use an Y×X transform and the second device would use an N×M transform.

Figure 3A:
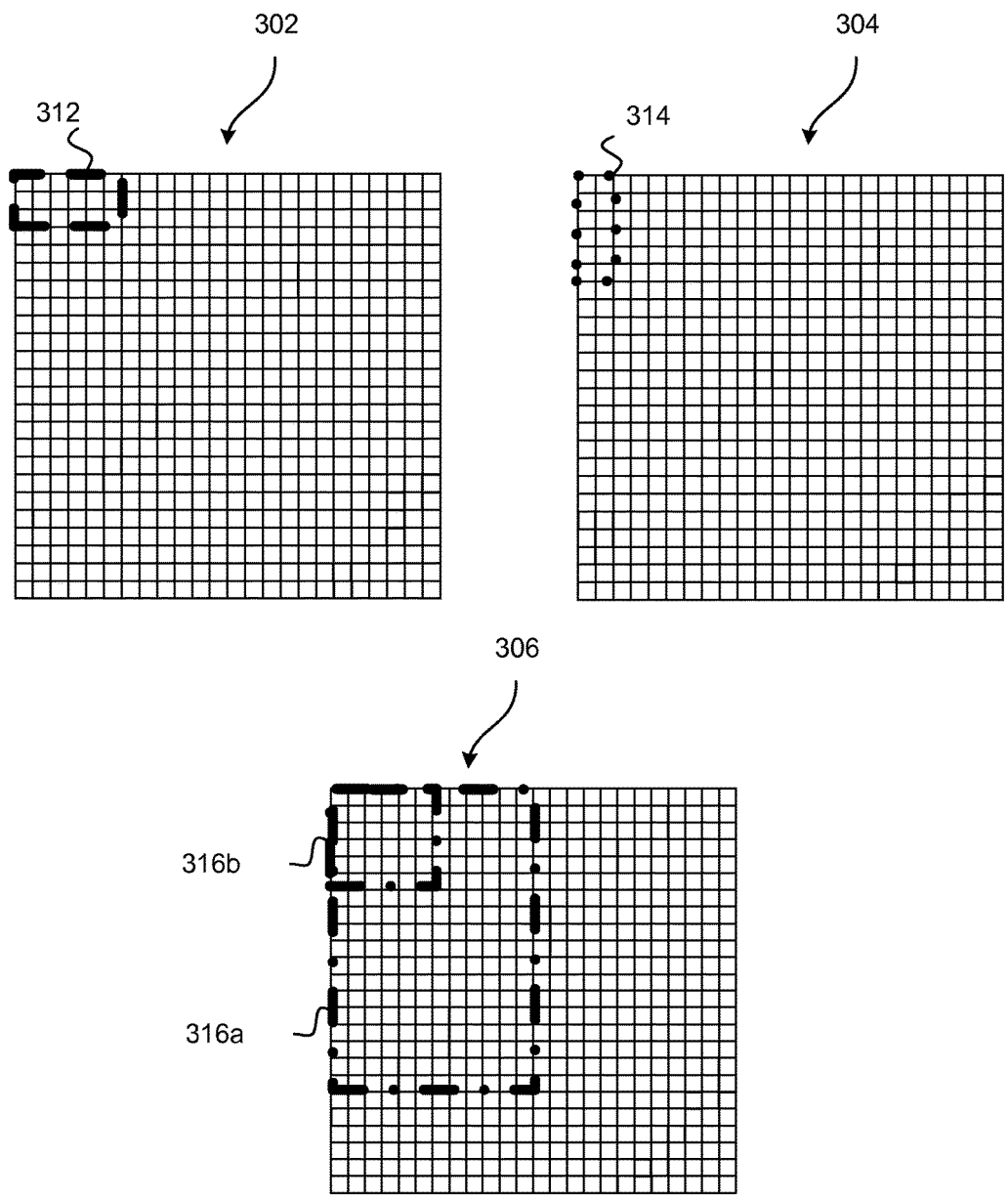
FIGS. 3A-3B illustrates different histogram pixel shape dimensions according to embodiments of the present disclosure.

Determining a customized histogram pixel shape for a customized histogram is illustrated in further detail below in reference to FIG. 3A. For example, a first device, having a first hardware configuration type, may be configured to calculate histogram values using a first histogram pixel shape, namely a 3 pixel high and 6 pixel wide tile of an image. Each instance of a region of the image covered by the histogram pixel shape, from which a histogram is calculated, may be referred to as a tile. This is shown in FIG. 3A for a first image 302 where the first image histogram is calculated for first histogram pixel tile 312 of the first image 302. Multiple first histograms for multiple regions of the image may be calculated. For example, if the entire image 302 were 300 pixels high and 600 pixels wide, 10,000 histograms (each with histogram pixel shape dimensions of 3×6) may be calculated, with each histogram pixel tile covering a different part of the image 302 so as to include each pixel of the image 302 in a histogram.

A second device, having a second hardware configuration type, may be configured to calculate histogram values using a second histogram pixel shape with dimensions of 6 pixels high and 2 pixels wide. This is shown in FIG. 3A for a second image 304 where the second image histogram is calculated for second histogram pixel tile 314 of the second image 304.

To configure a customized histogram that may eventually be used by either the first device or the second device to make HDR determinations, the system may configure a customized histogram pixel shape using both the first histogram pixel shape and the second histogram pixel shape. In the example of FIG. 3A, the system may configure a customized histogram pixel shape shown by customized pixel tile 316a. For customized pixel tile 316a, the customized pixel shape has a height of 18 pixels, which is the height of the first histogram pixel shape (3 pixels) times the height of the second histogram pixel shape (6 pixels). The customized pixel shape of tile 316a has a width of 12 pixels, which is the width of the first histogram pixel shape (6 pixels) times the width of the second histogram pixel shape (2 pixels). The 18×12 customized histogram pixel shape may now be used to identify different tiles in an image that histograms may be calculated for, thus obtaining customized histogram values for the image. Values for the customized histogram may be obtained for different tiles of an image to include all (or substantially all) of the pixels in an image as part of one of the customized histograms taken of the image.

With the configured customized histogram pixel shape established, the system may determine value(s) of the customized histogram for the images in the training set. The machine learning models for HDR determination may then be trained on the values of the customized histogram. Then, at runtime, individual devices may calculate values of the customized histogram to process using the models to make runtime HDR determinations.

Turning again to the examples of FIG. 3A. The first device, due to its first hardware configuration type, may be configured to capture histogram values for tiles of the first histogram pixel shape (i.e., 3×6). To obtain values for the customized histogram, the first device may combine values for the first histogram such that the pixels included in the combined first histograms equal the pixels included in the customized histogram. As the customized histogram pixel shape is 18×12 and the first histogram pixel shape is 3×6, 12 of the first histograms will be combined to equal a customized histogram. Those 12 first histograms may correspond to first tiles overlapping the customized histogram tile. This is illustrated in FIG. 3B.

Figure 3B:
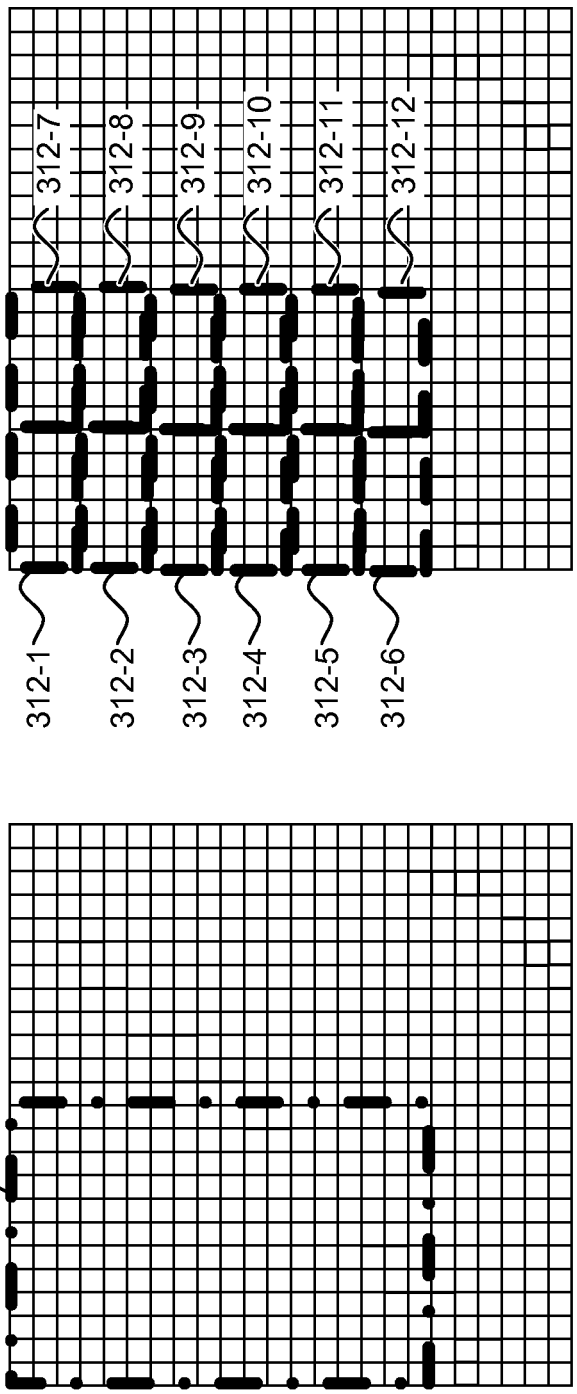

As shown in FIG. 3B, the customized histogram pixel tile 316a may include pixels from a certain region of the image. To create a customized histogram corresponding to that image, the first device may identify subregions for the certain region, where each subregion has the same dimensions (3×6) as a first histogram pixel shape. Each subregion also includes certain pixels of the certain region, and each subregion is associated with a first histogram pixel tile, shown as pixel tiles 312-1 through 312-12. To identify pixel tiles 312-1 through 312-12, the first device may determine the specific pixels included in customized histogram pixel tile 316a, where each pixel may be separately addressable and/or have coordinates within the image, such as (0,0) for the first tile in the upper left-hand corner, (0,1) for the pixel directly to the right of pixel (0,0), (1,0) for the pixel directly below pixel (0,0), and so on. The first device may then select the first histogram pixel tiles that cover the same specific pixels as customized histogram pixel tile 316a, namely first pixel tiles 312-1 through 312-12. The first device may then determine first histogram values for each of the pixels groups corresponding to each pixel tile, thus calculating a first histogram value for first pixel tile 312-1, a first histogram value for first pixel tile 312-2, and so on through a first histogram value for first pixel tile 312-12. The first device may then combine the twelve first histogram values to obtain the customized histogram value, which is a histogram value corresponding to the pixels included in customized histogram pixel tile 316a.

The first device may continue to determine customized histogram values for the remainder of the regions of the image in question. The first device may process the customized histogram value(s) using with the trained model to make an HDR determination for the particular image of the first device. A similar process may be performed by the second device for a particular image taken by the second device, only the second device may combine second histogram pixel tiles to arrive at the customized histogram pixel tile 316a. Specifically, 18 2×6 second histogram pixel tiles 314 will be needed to cover the same pixels as the customized pixel tile 316a and 18 second histogram values will be combined to obtain a customized histogram value. The second device may process its customized histogram value(s) using with the same trained model to make an HDR determination for the particular image of the second device. Thus the same trained model may be used by different devices for HDR determinations, as each device is configured to calculate customized histogram values used by the trained model.

As explained above, a customized histogram pixel shape may be determined by multiplying histogram pixel shapes from different hardware configuration types. In another example, the system may determine a customized histogram pixel shape using a "least common denominator" approach where the customized histogram pixel shape is a smaller histogram that still may be calculated using multiples of the individual histogram pixel shapes from different hardware configuration types. For example, as shown in FIG. 3A, the customized histogram pixel shape may be 6 pixels high and 6 pixels wide as shown by customized pixel tile 316b. As can be appreciated, customized histogram pixel tile 316b is smaller than customized histogram pixel tile 316a, but customized histogram pixel tile 316b can still be calculated using multiples of first histogram pixel tile 312 or second histogram pixel tile 314. For example, two of first histogram pixel tile 312 may be used to calculate customized histogram pixel tile 316b or three of second histogram pixel tile 314 may be used to calculated customized histogram pixel tile 316b. Thus, the first device may calculate a value for a customized histogram of tile 316b using values for the first histogram of tile 312. Similarly, the second device may calculate a value for customized histogram of tile 316b using values for the second histogram of tile 314.

Once a customized image metric (such as the customized histogram for tiles 316a, 316b or other image metric) has been determined, the system may then obtain a value for the customized image metric for the images in the training set. Multiple values for the customized histogram may be obtained for each image, for example to cover the entire image using the customized histogram. The system may then use the values for the customized image metric to train the HDR machine learning component and create a model that can be distributed to individual devices.

Although certain histogram pixel shapes/tiles are discussed above, other histogram pixel shapes/tiles are possible. Further, other histogram related values may be used such as average or median pixel tone values from a histogram, the number of pixels beyond a particular tone in a histogram, focus metrics for values in a histogram, etc. Beyond customized histograms, other examples of customized image metric(s) are also possible. Customized image metric(s) may also be based on data from portions of an image rather than from an entire image. For example, certain systems may be configured to analyze specific lines of images, or other small regions or patterns of images, for interleaved processes related to HDR. For such systems, customized image metrics may be based on those techniques as well, thus allowing models to be trained for devices configured to employ such techniques.

Values for the customized image metric(s) are given to each training image during training of the system. Further, each training image may be associated with a training recommendation, such as whether each image does or does not call for HDR imaging. The models describe above may then be trained based at least in part on the training images, the training recommendations and the values for the customized image metric(s). Then at runtime a device calculates values for the customized metric(s) for each incoming image. To calculate values for the customized metric(s) a particular device may need to transform or normalize other values for default metric(s) calculated by the device in order to determine values for the customized metric(s). The device may then use the machine learning model(s) to analyze the customized metric values to make an HDR determination.

Traditionally, HDR determinations are based exclusively on image metrics, that is, data taken from the data of the image itself, such as brightness measurements, contrast measurements, histogram data, etc. If an image has certain image metric qualities, then the system will recommend or not recommend activation of HDR imaging. In addition to image data, however, each image may also be associated with non-image data, such as values for non-image metrics that describe the context of the device when the image was taken. Such non-image metrics are metrics measuring data not taken from the image itself. Examples of non-image metrics include device location (including GPS coordinates, altitude, whether the device is indoors or outdoors, etc.), device heading (such as the cardinal direction the camera is facing when an image is captured (e.g., North)), device orientation (i.e., portrait or landscape), output of device sensors (such as a gyroscope, accelerometer, microphone, thermometer, proximity sensor, ambient light sensor, or the like), time of day, date, etc.

Presently, such non-image metrics are ignored when making HDR determinations, however ASD processing and HDR determinations may be improved by also incorporating non-image metrics in HDR determinations. Such non-image metrics may be particularly valuable in making an HDR determination under certain circumstances. For example, if photographs at particular locations at specific times are commonly candidates for HDR imaging (for example, a photograph of Mount Rushmore at sunset with the device facing west), photographic quality and the user experience may be improved if devices were able to make use of non-image data to activate HDR imaging.

To make this possible, images in training data may also be associated with values for non-image metrics such as those described above, or others. Thus the machine learning processes may also incorporate non-image data when training models to assist with HDR determinations. With sufficient large training data sets, the models may be able to incorporate a wide-variety of situations where non-image data can significantly improve runtime HDR determinations.

Non-image metric values may be incorporated into the machine learning processing in a number of different ways. In particular, the system may incorporate a multi-modal learning configuration, where the non-image data may be incorporate several ways when training the machine learning system and/or when determining at run-time whether to activate HDR imaging. For example, as shown in FIG. 4, the neural network module 832 (or other machine learning component) may be trained to make a determination for HDR processing based on the image data 404 as well as the non-image data 402. Thus, during runtime this data may be input to and processed by the neural network module 832 to determine whether HDR imaging should be activated. The neural network module 832 may thus act as an adaptive filter to determine whether HDR imaging should be activated based on the available input. The output from the neural network module 832 may include a binary output as to whether HDR imaging should be activated or may include a score indicating a relative value as to whether HDR imaging should be activated for consideration by another downstream component.

In addition to the non-image data 402 being input to the neural network module 832, non-image data 402 may also be input to an inference engine 834 that is trained on non-image data. The inference engine 834, or other machine learning component such as an expert system, trained classifier, etc., may process the non-image data 402 to provide a score or similar output to the neural network module 832. The output from the inference engine may represent a confidence that HDR imaging should be activated based on the non-image data 402. For example, a score of from 0-100 may be sent, where 0 indicates no HDR is necessary while a score of 100 indicates full confidence that HDR is necessary. The score is based on the processing of the non-image data 402 by the trained inference engine 834 (or other machine learning component). The score output from the inference engine 834 may also be a weight the neural network module 832 should give to the non-image data 402 when making the HDR determination. The neural network module 832 may thus also be trained using outputs from the inference engine 834 (or output from another machine learning component, such as a classifier, etc. that is trained on the non-image data).

In another example, the non-image data 402 may not necessarily be input to the neural network module 832, but rather input only to the inference engine 834. In this example, the inference engine 834 may output to the neural network module 832 a score that represents the impact of the non-image data 402 on the HDR determination. The score from the inference engine 834 may thus impact the ultimate determination made by the neural network module 832. Thus the system may incorporate the impact of non-image data 402 on the HDR determination separately from the impact of image data 404 on the HDR determination or the different data types may be considered together. In another aspect, certain non-image data (such as GPS data) may be sent to both the inference engine 834 and the neural network module 832 whereas other non-image data (such as time data) may be sent only to the inference engine 834. Various combinations and configurations are possible depending on system configuration and desired functionality.

The ultimate system configuration will also impact what data each machine learning component (834, 832, or others) is trained to handle, and what training data is used to create the processing models used by the machine learning component(s). Thus certain configurations of the system may call for models to be trained using non-image data 402 and image data 404 separately while other configurations of the system may call for models to be trained on non-image data 402 and image data 404 together. As can be appreciated, the image data 404 may include values for the customized image metric(s) discussed above, and/or may include values for other image metric(s), such as the default histograms calculated by devices.

When training the models, various techniques may be used. For example, a standard back propagation training algorithm may be used. In another example, an expert system may be used to make an HDR determination based on non-image data and the output of the expert system may be input into a neural network (for example, output from the inference engine being sent to a neural network component as explained above in reference to FIG. 4). In another example, a different expert system may analyze image data and provide summarized inputs to the neural network (for example, if certain portions of an image histogram show very bright or very dark sections). Various different configurations are possible.

Figure 5A:
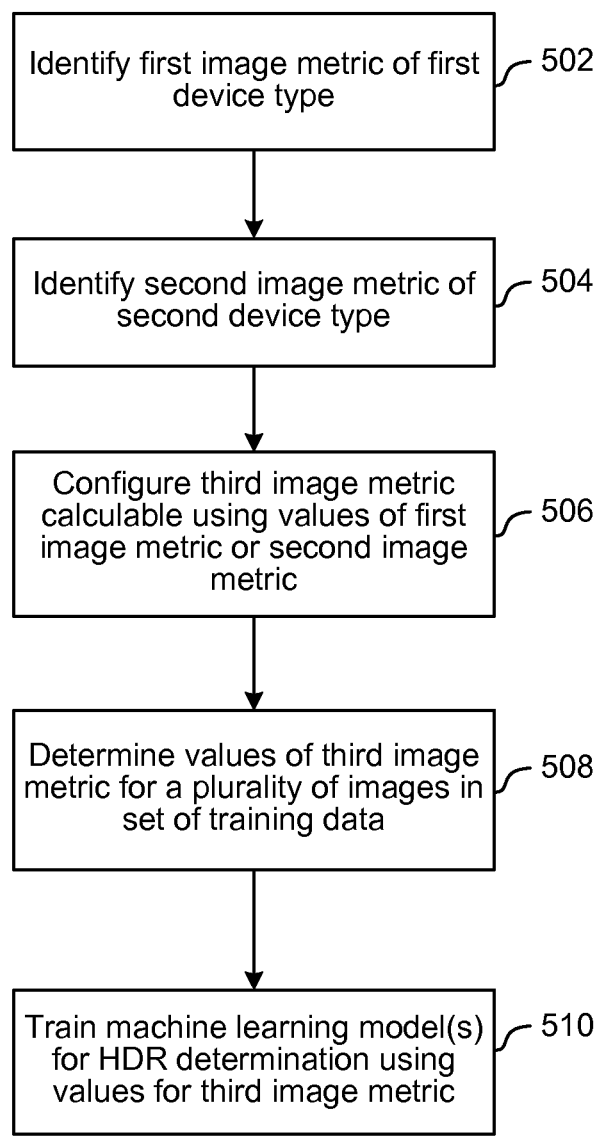
FIGS. 5A-5D illustrate training machine learning models to make HDR imaging determinations according to embodiments of the present disclosure.

As shown in FIG. 5A, a system, such as one including a training server, may identify (502) a first image metric of a first hardware configuration type. The first image metric may be an image metric that is calculable by devices of the first hardware configuration type. For example, the first image metric may be a histogram that is calculated by certain hardware sets of the first hardware configuration type. The system may also identify (504) a second image metric of a second hardware configuration type. The second image metric may be an image metric that is calculable by devices of the second hardware configuration type such as a histogram that is calculated by certain hardware sets of the second hardware configuration type. The system may then configure (506) a third image metric calculable using values of the first image metric or second image metric. Thus the third image metric may be a specially configured customized image metric that is calculable by devices of the first hardware configuration type or the second hardware configuration type using the values for the image metrics of the respective hardware configuration types. For example, such a customized metric may be a histogram corresponding to histogram tiles 316a or 316b as explained above, where histogram values for histogram tiles 316a or 316b are calculable using multiples of first histograms for shapes of tile 312 or multiple values of second histograms for shapes of tile 314.

The system may then determine (508) values of the third image metric for a plurality of images in a set of training data. Thus each training image may be associated with one or more values of the third image metric. The system may then train (510) one or more machine learning model(s) to determine whether to apply HDR imaging using the values for the third image metric. The model is also trained using other data such as the training recommendations for each image, etc.

Figure 5B:
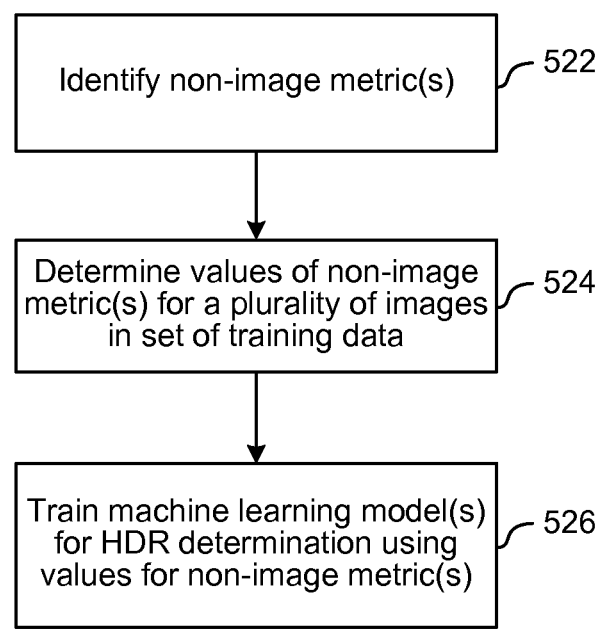

As shown in FIG. 5B, the system may also train the model(s) based on data for non-image metric(s), such as image context data like location, motion, etc. The system may identify (522) one or more non-image metric(s). The system may then determine (524) values of the non-image metric(s) for a plurality of images in a set of training data. The system may then train (526) one or more machine learning model(s) to determine whether to apply HDR imaging using the values for the non-image metric(s). The model is also trained using other data such as the training recommendations for each image, etc.

Figure 5C:
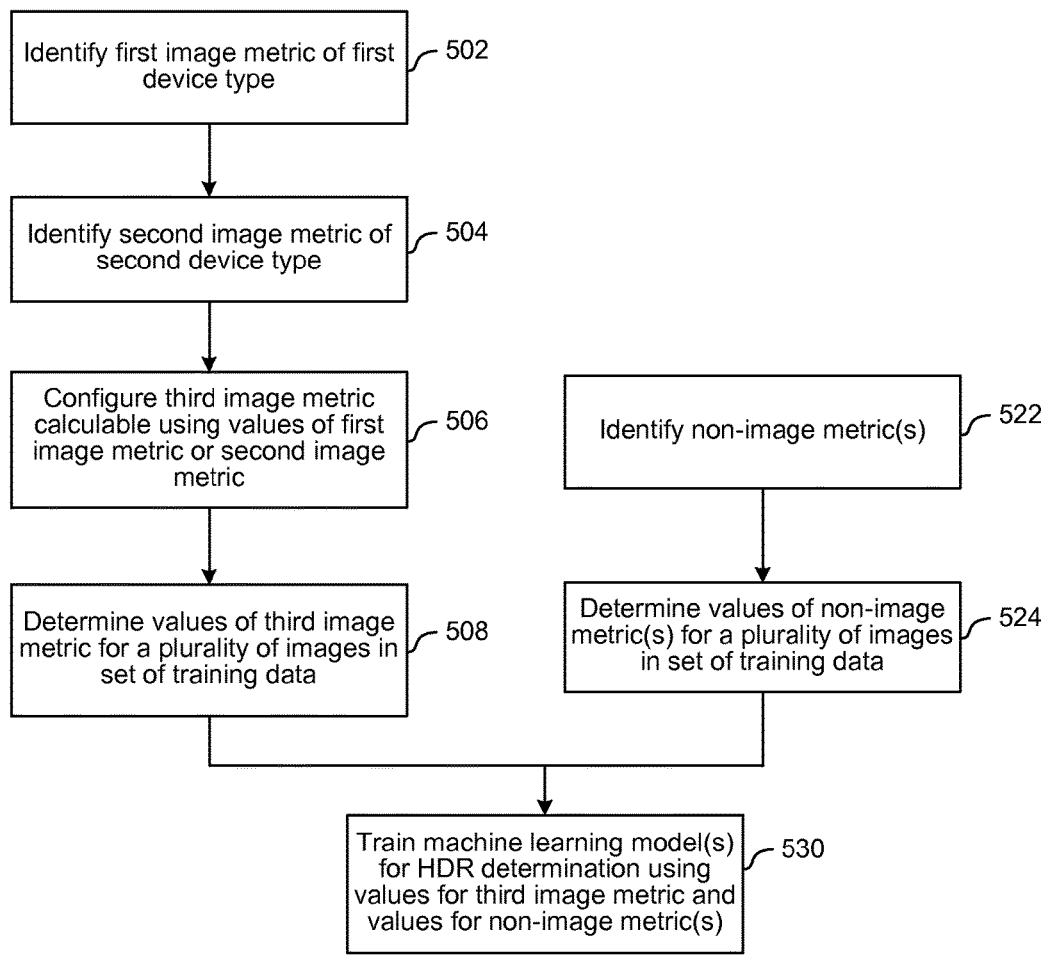

As shown in FIG. 5C, the system may train (530) the model(s) based on both data for the third image metric and the non-image metric(s). The model is also trained using other data such as the training recommendations for each image, etc. With such a model devices during runtime may consider both the data for the third image metric and the non-image metric(s) when using the model to determine whether to activate HDR imaging.

Figure 5D:
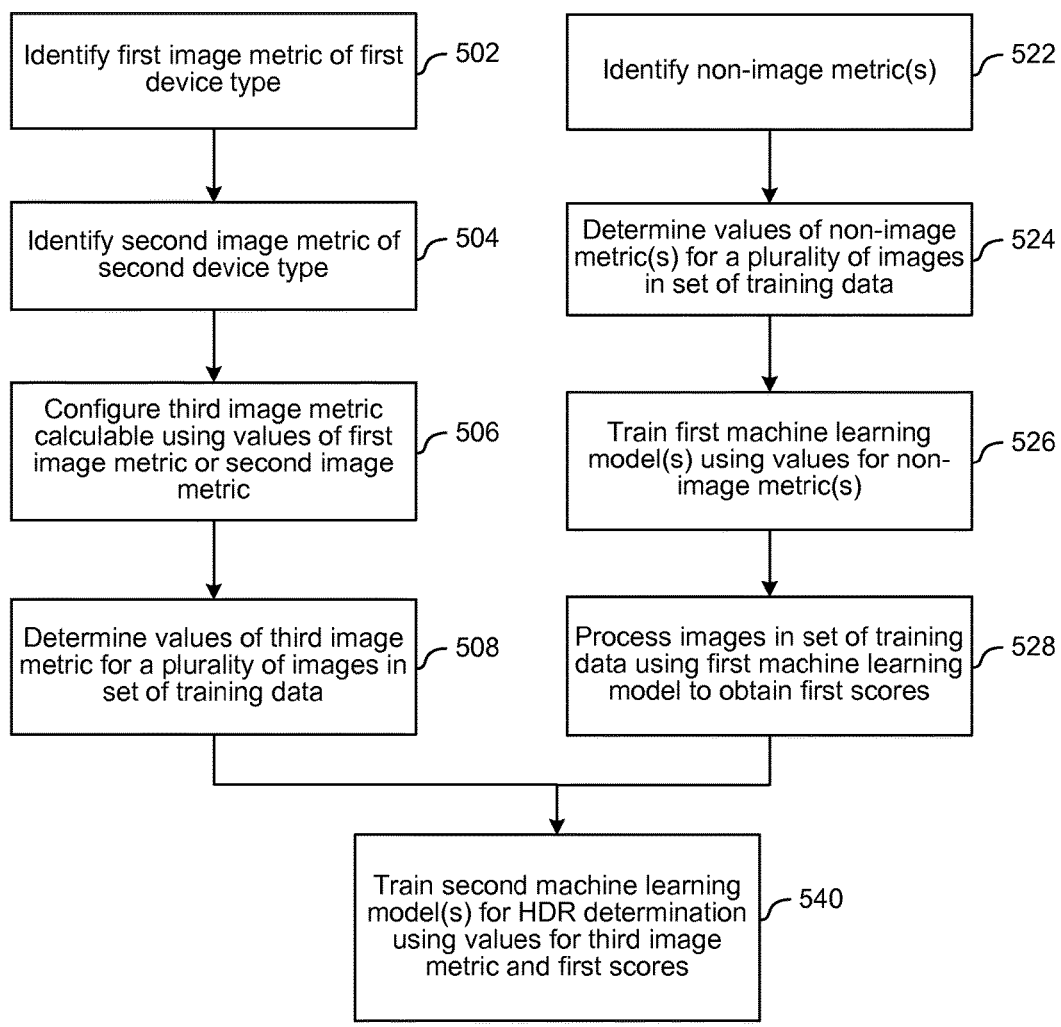

As explained above in reference to FIG. 4 and shown in FIG. 5C, non-image data may be incorporated directly when creating the machine learning model. In another example, however (also discussed above in reference to FIG. 4), an interim machine learning component, such as an inference engine may be trained on the non-image data and the output of the inference engine (either in the form of confidence scores or otherwise) may be incorporated when training the machine learning model for HDR determination. This example is illustrated in FIG. 5D. As shown in FIG. 5D, the system may train (526) a first machine learning model (such as a model for an inference engine) using values for the non-image metric(s) and may process (528) the images in the training set using the first machine learning model to obtain first scores. The system may then train (540) a second machine learning model(s) (such as for a neural network component) for HDR determination using values for the third image metric as well as the first scores. The model is also trained using other data such as the training recommendations for each image, etc.

Figure 6:
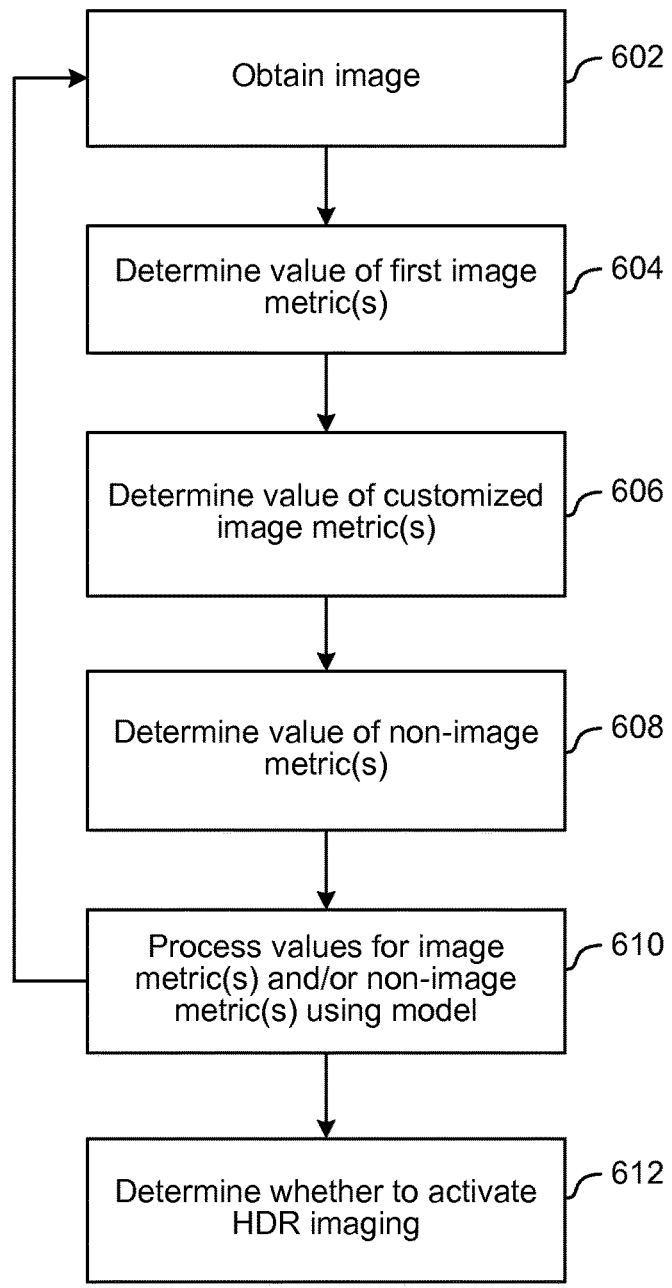
FIG. 6 illustrates operation of a device to make HDR determinations using trained models according to embodiments of the present disclosure.

Whatever model(s) is constructed for HDR determination by the system, such as by a server of the system, that model may be distributed to devices (such as client mobile devices) that take pictures and/or may apply HDR imaging based on the model(s). Operations of such devices is illustrated in FIG. 6. A mobile device may obtain (602) an image, such as from a feed of a camera of the device. The device may then determine (604) a value for the image of a first image metric associated with the mobile device. For example, the device may determine value(s) for a first histogram that the mobile device is configured to calculate. The device may then determine (606) a value of a customized image metric(s) that may be used in HDR determination. The value of the customized image metric(s) may be calculated using values of the first image metric. The device may also determine (608) a value for non-image metric(s). The non-image metric(s) may include metric(s) that describe the context in which the image was taken. For example, output from sensors like location, motion, direction, and/or orientation sensors, where the output of the sensors correspond to a time that the image was taken using the camera. The device may then process (610) the values for the customized image metric(s), first image metric(s) and/or non-image metric(s) using a model received from the server. The metric(s) used by the model may depend on how the model was trained (e.g., if the model was trained on the customized image metric(s) and certain non-image metric(s), values for those metrics would be processed in step 610). The device may then determine (612) whether to activate HDR imaging based on the processing using the model. As noted above in the discussion of FIG. 1, the determination whether to activate HDR imaging may also be based on the processing of multiple different images taken from an image feed. For example, several images from the feed may be processed in quick succession, and the metric values for the different images considered together (or separately) by the system to make the determination on HDR imaging. Accordingly, the device may repeat steps 610-612 prior to the determining step 612. Correspondingly, the model(s) used to process (610) the value(s) may also be trained on accumulated, averaged, or otherwise combined metric value(s) to allow the device to use the model(s) at runtime to make the HDR imaging determination. Following the determining (612), if appropriate, the device may then perform HDR imaging on image(s) obtained by the device's camera, which may be the image obtained in step 602, or may be a subsequent image, such as a later image in the camera feed. Or the device may activate an indicator to a user so that the user may activate HDR imaging if desired. The indicator may include a flashing light, icon, sound, etc.

Figure 7:
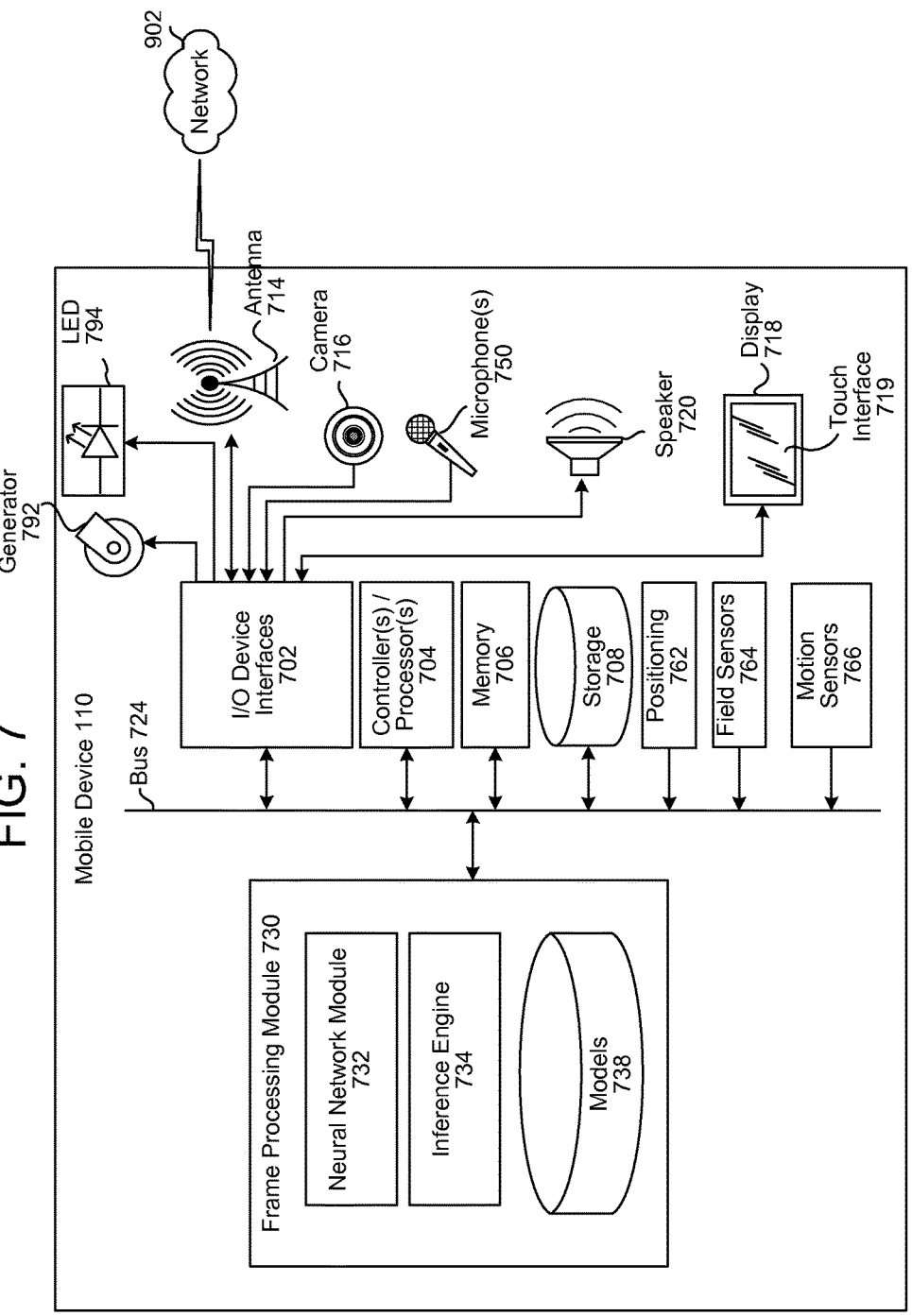
FIG. 7 is a block diagram conceptually illustrating example components of a device of the system in FIG. 1.

FIG. 7 is a block diagram conceptually illustrating example components of the device 110 of the system 100. In operation, the device 110 may include computer-readable and computer-executable instructions that reside on the device 110, or that may reside on a network-connected device operating in conjunction with device 110, as will be discussed further below.

As illustrated in FIG. 7 the device 110 may include wireless network radio connectivity (e.g., antenna 714), one or more cameras (716), a display 718, and a user interface such as touch interface 719. "Camera" includes image capture systems used to capture images, and includes (among other things), cameras used for photography and for the capture of video. The camera 716 may obtain a series of images (i.e., an image feed), where individual images of the image feed may be evaluated for potential HDR imaging (and processed with such HDR imaging) as disclosed herein.

The display 718 may be a display of any suitable technology, such as a liquid crystal display, an organic light emitting diode display, electronic paper, an electrochromic display, or other suitable component(s). The cameras 716, display 718, and other components may be integrated into the device 110, or may be separate, connected to the device 110 by a wired or wireless connection.

The device 110 may also include an audio output component such as a speaker 720, a wired or wireless headset (not illustrated). Other output devices include a haptic effect generator 792. The haptic effect generator may be of any haptic technology, including technologies to vibrate the entire device 110 (e.g., electromagnetic technologies such as vibratory motor or a coil with a central mass) and/or may comprise technologies allowing the haptic effect to be localized to a position of the touch interface 714, such as electroactive polymers, piezoelectrics, electrostatics, subsonic audio wave surface actuation, etc. The device may also include an LED 794 or other light emitting component to provide other visual feedback to a user other than that provided through display 712. As a result of the output of the neural network module 732, the device 110 may activate an indicator to a user to turn on HDR imaging. For example, a device may flash an LED 794, vibrate the device using a haptic generator 792, output an audio indication through speaker 720, or display an icon or other indicator to the user on display 718 to turn on HDR imaging. In another example, as a result of the output of the neural network module 732, the device 110 may turn on HDR imaging without receiving a user command to do so. Activating HDR imaging without the user command may be useful in applications that make use of images from an image feed of a camera 716, such as an object identification application, iris identification application, or the like, where video images are used but specific "pictures" may not necessarily be taken by the user.

As shown in FIG. 7, the device 110 may include one or more of a variety of sensors. Among the sensors are an audio capture component such as microphone(s) 750, an image and/or video capture component such as camera(s) 716, a touch interface 719, an antenna 714, positioning sensors 762, field sensors 764 (e.g., a 3-axis magnetometer, a gravity sensor, compass), and motion sensors 766 (e.g., a 3-axis accelerometer, a 3-axis gyroscope). The device 110 may also include one or more buttons (not shown). Several of each of these components may be included. Also, although shown as integrated within device 110, some or parts of the various sensors may be external to device 110 and accessed through input/output device interfaces 702 either wirelessly or through a physical connection.

The positioning module 762 provides an interface for acquiring location information, such as information from satellite geographic positioning system(s). For example, the positioning module 762 may include a Global Positioning System (GPS) receiver and/or a Global Navigation Satellite System (GLONASS) receiver. The positioning module 762 may also acquire location-based information using other radio sources (e.g., via antenna 714), such as mapping services that triangulate off of known WiFi service set identifiers (SSIDs) or cellular towers within range of the device 110.

The field sensor module 764 provides directional data. The field sensor module 764 may include a 3-axis magnetometer that measures magnetic fields and may serve as a compass. The field sensor module 764 may also include a dedicated gravity sensor to determine up-and-down.

The motion sensor module 766 provides inertial data, and may include 3-axis accelerometer and a 3-axis gyroscope.

Examples of other sensors that may be configured on the device include an electronic thermometer to measure ambient temperature, an ambient light sensor to measure ambient light, a proximity sensor to detect whether there is an object within a certain distance of the device 110, or the like.

The antenna 714 and related components (e.g., radio transmitter/receiver/transceiver, modem, etc.) may be configured to operate with a wireless local area network (WLAN) (such as WiFi), Bluetooth, and/or wireless networks, such as a Long Term Evolution (LTE) network, WiMAX network, 3G network, etc.

The audio capture component may be, for example, a microphone 750 or array of microphones, a wired or wireless headset (not illustrated), etc. If an array of microphones is included, approximate distance to a sound's point of origin may be performed acoustic localization based on time and amplitude differences between sounds captured by different microphones of the array.

The device 110 may include an address/data bus 724 for conveying data among components of the device 110. Each component within the device 110 may also be directly connected to other components in addition to (or instead of) being connected to other components across the bus 724.

The device 110 may include one or more controllers/processors 704, that may each include a central processing unit (CPU) for processing data and computer-readable instructions, and a memory 706 for storing data and instructions. The memory 706 may include volatile random access memory (RAM), non-volatile read only memory (ROM), non-volatile magnetoresistive (MRAM) and/or other types of memory. The device 110 may also include a data storage component 708, for storing data and controller/processor-executable instructions (e.g., instructions to perform the processes illustrated in, and discussed in connection with, FIGS. 1 and 6). The data storage component 708 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 702.

Computer instructions for operating the device 110 and its various components (such as the modules/engines 732 and 736 of the frame processing module 730) may be executed by the controller(s)/processor(s) 704, using the memory 706 as temporary "working" storage at runtime. The computer instructions may be stored in a non-transitory manner in non-volatile memory 706, storage 708, or an external device. Alternatively, some or all of the executable instructions may be embedded in hardware or firmware in addition to or instead of software.

The device 110 includes input/output device interfaces 702. A variety of components may be connected through the input/output device interfaces 702, such as the display 718, a speaker 720, a microphone 750, and the user interface (e.g., touch interface 719). The input/output device interfaces 702 may also include an interface for an external peripheral device connection such as universal serial bus (USB), Thunderbolt or other connection protocol. The input/output device interfaces 702 may also include a connection to one or more networks 1202 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1202, the system 100 may be distributed across a networked environment, as will be discussed further below with FIG. 12.

The device 110 further includes a frame processing module 730 that may perform the processes discussed in connection with FIGS. 1 and 6, and/or works in conjunction with another device in the system 100. For example, a first device 110 may include the camera 716 and capture a frame 120, whereas a second device 110 (or a support device 812 such as a server) includes all or part of the frame processing module 730 that determines whether to activate HDR imaging. The frame processing module 730 may also be configured to perform HDR imaging.

The frame processing module 730 includes a neural network module 732 that may run a model(s) to determine whether to activate HDR imaging, for example using data of customized image metrics and/or data of non-image metrics.

An inference engine 734 of the frame processing module 730 may be used to infer or score non-image metric data. The output of the inference engine 734 may in turn be passed to the neural network module 732 to assist in HDR determinations.

The neural network module 732 and/or inference engine 734 may also be components configured to employ other machine learning techniques such as trained classifiers, etc. as described above and known in the art.

Models for use by the neural network module 732 and/or the inference engine 734 may be stored in component 738.

Figure 8:
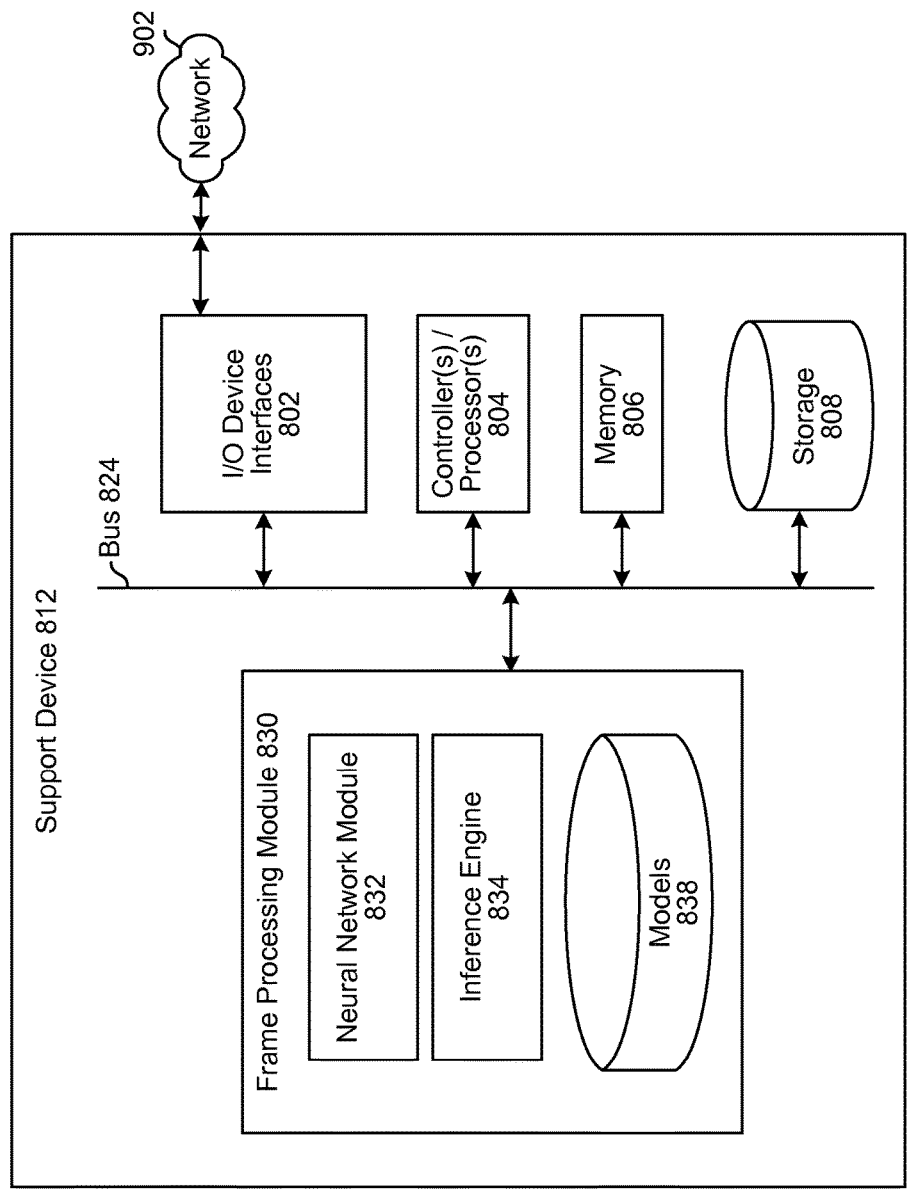
FIG. 8 is a block diagram conceptually illustrating an illustrating example components of a network-connected support device of the system FIG. 1.

FIG. 8 is a block diagram conceptually illustrating example components of a network-connected support device 812 of the system 100. The support device 812, such as a server, may construct and store the models and sent to the mobile device 110 that are used for HDR determination. In operation, the support device 812 may include computer-readable and computer-executable instructions that reside on the support device 812.

The support device 812 may include an address/data bus 824 for conveying data among components of the support device 812. Each component within the support device 812 may also be directly connected to other components in addition to (or instead of) being connected to other components across the bus 824.

The support device 812 may include one or more controllers/processors 804, that may each include a central processing unit (CPU) for processing data and computer-readable instructions, and a memory 806 for storing data and instructions. The memory 806 may include volatile random access memory (RAM), non-volatile read only memory (ROM), non-volatile magnetoresistive (MRAM) and/or other types of memory. The support device 812 may also include a data storage component 808, for storing data and controller/processor-executable instructions (e.g., instructions to perform the processes illustrated in, and discussed in connection with, FIGS. 1, 3, 4, and 5A-5D). The data storage component 808 may include one or more non-volatile storage types such as magnetic storage, optical storage, solid-state storage, etc. The support device 812 may also be connected to removable or external non-volatile memory and/or storage (such as a removable memory card, memory key drive, networked storage, etc.) through the input/output device interfaces 802.

Computer instructions for operating the support device 812 and its various components (such as the engines 832 to 836 of the frame processing module 830) may be executed by the controller(s)/processor(s) 804, using the memory 806 as temporary "working" storage at runtime. The computer instructions may be stored in a non-transitory manner in non-volatile memory 806, storage 808, or an external device. Alternatively, some or all of the executable instructions may be embedded in hardware or firmware in addition to or instead of software.

The support device 812 includes input/output device interfaces 802. A variety of components may be connected through the input/output device interfaces 802. The input/output device interfaces 802 may also include an interface for an external peripheral device connection such as universal serial bus (USB), Thunderbolt or other connection protocol. The input/output device interfaces 802 may also include a connection to one or more networks 902 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 902, the system 100 may be distributed across a networked environment, as will be discussed further below with FIG. 9.

The support device 812 further includes a frame processing module 830 that performs the processes discussed in connection with FIGS. 1, 3, 4, and 5A-5D, and/or works in conjunction with other devices in the system 100. For example, a mobile device 110 may include the camera(s) 716 and capture the image to be processed, whereas the support device 812 constructs the models used in HDR determination. In a further example, the mobile device 110 may take an image and calculate values for a first image metric corresponding to the image. The first image metric may correspond to the hardware configuration type of the mobile device 110. The mobile device 110 may also calculate values for non-image metrics corresponding to the image. The mobile device 110 may then send the image and/or the metric values to the support device 812. The support device 812 may then receive the image and/or the metric values and make an HDR determination for the image using the model and the image and/or metric values.

The frame processing module 830 includes a neural network module 832 that may process training data and associated image or non-image metric values to construct a model for use in other devices for HDR determination.

An inference engine 834 may process non-image metric data to determine scores or other output that may be used by the neural network module 832 when constructing model(s) for use by image-taking devices at runtime.

The neural network module 832 and/or inference engine 834 may also be components configured to employ other machine learning techniques such as trained classifiers, etc. as described above and known in the art.

The components of the device 110 as illustrated in FIG. 7 and the support device 812 as illustrated in FIG. 8 are exemplary, and may be a stand-alone device or may be included, in whole or in part, as a component of a larger device or system. The concepts disclosed herein may be applied within a number of different devices and computer systems, including, for example, image-scanning general-purpose computing systems, server-client computing systems, "smart" cellular telephone computing systems, personal digital assistants (PDAs), cameras, image scanners, tablet computers, wearable computing devices (glasses, etc.), other mobile devices, etc.

Figure 9:
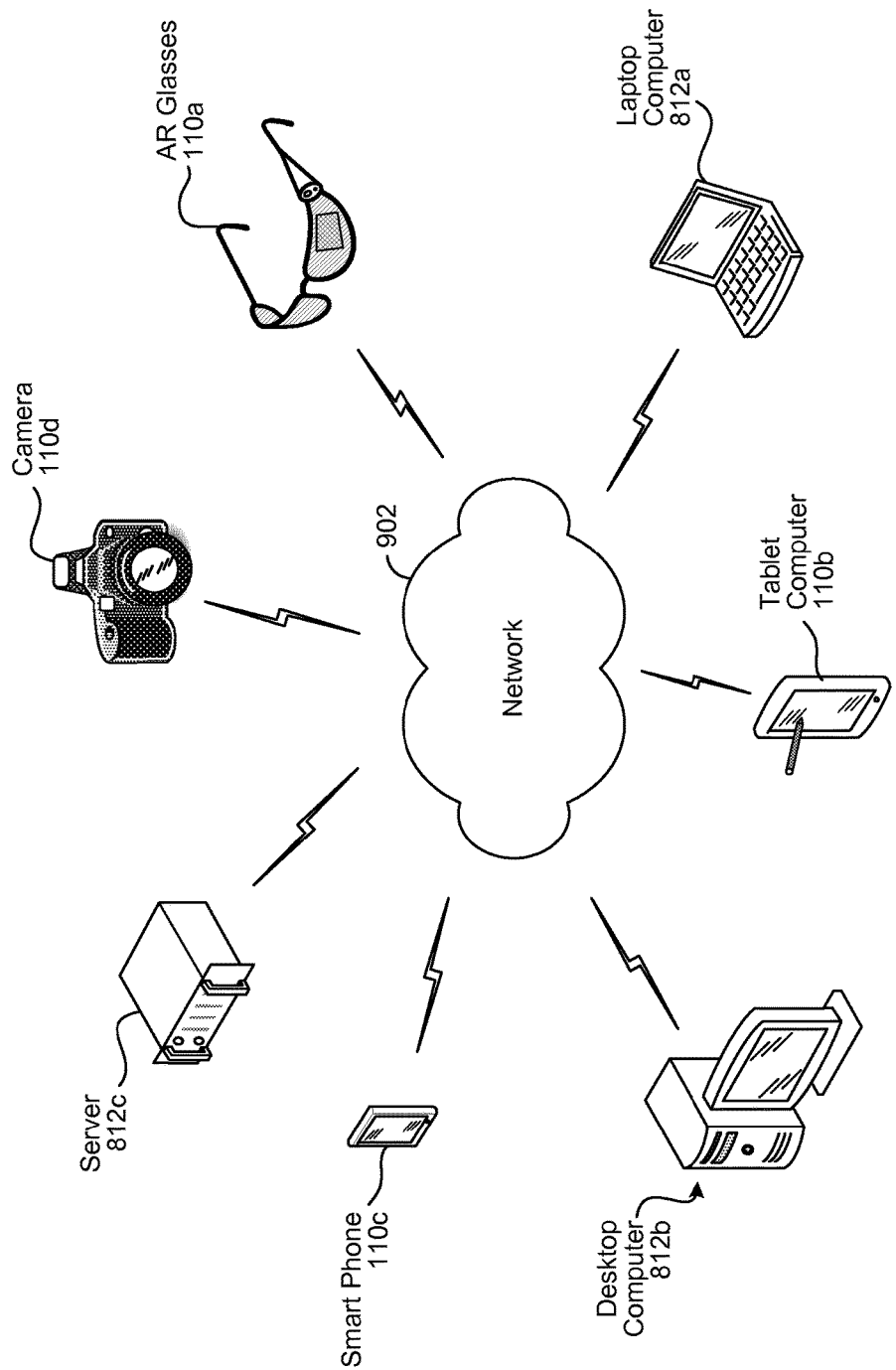
FIG. 9 illustrates an example of a computer network for use with the system.

As illustrated in FIG. 9, multiple devices (110a to 110d) may contain components of the system 100 and the devices may be connected over a network 902. Network 902 may include a local or private network or may include a wide network such as the internet. Devices may be connected to the network 902 through either wired or wireless connections. For example, augmented reality (AR) glasses 110a, a tablet computer 110b, a smart phone 110c, and a camera 110d may be connected to the network 902 through a wireless service provider, over a WiFi or cellular network connection or the like. Other devices are included as network-connected support devices 812, such as a laptop computer 812a, a desktop computer 110b, and a server 812c. The support devices 812 may connect to the network 902 through a wired connection or wireless connection. Networked mobile devices 110 may capture images using one or more built-in or connected camera 716 or frame capture devices, with processing performed by the devices 110 and/or the support devices 812, which may assist in determining whether to activate HDR processing. Further, support devices 812, particularly 812c may perform training of machine learning models used by the frame processing module 730.

The above examples are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, image processing, trained classifiers, and optical character recognition (OCR) should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines of the frame processing modules 730 and 830 may be implemented as firmware in hardware. For example, portions of the frame processing modules 730 and 830 may be implemented as a digital signal processor (DSP) and/or application-specific integrated circuit (ASIC).

As used in this disclosure, the term "a" or "one" may include one or more items unless specifically stated otherwise. Further, the phrase "based on" is intended to mean "based at least in part on" unless specifically stated otherwise.

What is claimed is:

1. A computer implemented method comprising:
   by a server device:
   configuring a customized shape for an image section, the image section including pixels for calculating a histogram value, wherein:
   the customized shape is configured by multiplying first dimensions by second dimensions;
   the first dimensions are of a first shape used by a first hardware configuration type to calculate histograms; and
   the second dimensions are of a second shape used by a second hardware configuration type to calculate histograms,
   determining a first training image,
   determining a second training image,
   determining a first training histogram value for the first training image using the customized shape,
   determining a second training histogram value for the second training image using the customized shape,
   determining a first training recommendation for the first training image, wherein the first training recommendation comprises a first indication that the first training image is to be processed by high dynamic range (HDR) imaging,
   determining a second training recommendation for the second training image, wherein the second training recommendation comprises a second indication that the second training image is to be processed by HDR imaging,
   training a model for use by a neural network component when determining whether to perform HDR imaging for future image data associated with an image received by the server device in the future, wherein the training is based at least in part on the first training image, the second training image, the first training histogram value, the second training histogram value, the first training recommendation, and the second training recommendation, and
   sending the model to a client device.

2. The computer implemented method of claim 1, further comprising:
   by the client device, wherein the client device is a device of the first hardware configuration type:
   receiving the model from the server device,
   obtaining a first image from a camera of the client device,
   identifying a first region of the first image, the first region having the customized shape,
   determining a plurality of subregions of the first region, wherein each subregion is of the first shape,
   determining a first histogram value for pixels within each of the plurality of subregions,
   adding each of the first histogram values to obtain a second histogram value, the second histogram value corresponding to pixels in the first region,
   determining, using a neural network component, to perform HDR imaging on the first image based on the second histogram value and the model, and
   performing HDR imaging on the first image.

3. The computer implemented method of claim 2, further comprising:
   by the server device:
   determining first time training data for the first training image, the first time training data corresponding to a time the first training image was taken, determining second time training data for the second training image, the second time training data corresponding to a time the second training image was taken, wherein the training is further based at least in part on the first time training data and the second time training data; and by the client device:

determining first time data for the client device, the first time data corresponding to a time the first image was taken, wherein the determining to perform HDR imaging is further based on the first time data.

4. A computer-implemented method comprising:

determining a third image metric, wherein the third image metric is determined based on a first image metric measured by a first hardware configuration type and a second image metric measured by a second hardware configuration type;

determining a first training image;

determining a second training image;

determining a first training metric value for the first training image using the third image metric;

determining a second training metric value for the second training image using the third image metric;

determining a first training recommendation for the first training image, wherein the first training recommendation comprises a first indication that the first training image is to be processed by high dynamic range (HDR) imaging;

determining a second training recommendation for the second training image, wherein the second training recommendation comprises a second indication that the second training image is to be processed by HDR imaging; and training a model for determining whether to perform HDR imaging for an image, wherein the training is based at least in part on the first training metric value, the second training metric value, the first training recommendation, and the second training recommendation.

5. The computer-implemented method of claim 4, wherein the first image metric, second image metric, and third image metric are histograms.

6. The computer-implemented method of claim 4, wherein the model is a neural network model.

7. The computer-implemented method of claim 4, further comprising:

receiving a plurality of first image metric values from a first device of the first hardware configuration type, the plurality of first image metric values corresponding to a first image;

determining a third image metric value using the plurality of first image metric values;

determining to perform HDR imaging by the first device based at least in part on the third image metric value and the model; and sending an indication to the first device to perform HDR imaging.

8. The computer-implemented method of claim 4, further comprising:

determining a non-image metric;

determining a first training non-image metric value for the first training image using the non-image metric;

determining a second training non-image metric value for the second training image using the non-image metric; and training an inference engine using the first training non-image metric value and the second training non-image metric value, and wherein the training of the model is further based at least in part on output from the inference engine.

9. The computer-implemented method of claim 4, further comprising:

determining a non-image metric;

determining a first training non-image metric value for the first training image using the non-image metric; and determining a second training non-image metric value for the second training image using the non-image metric, and wherein the training is further based on the first training non-image metric value and the second training non-image metric value.

10. The computer-implemented method of claim 9, further comprising training an inference engine using the first training non-image metric value and the second training non-image metric value, wherein the training of the model is further based on output from the inference engine.

11. The computer-implemented method of claim 9, wherein the non-image metric is one or more of a location, a direction, a device orientation, motion sensor data, time, or date.

12. The computer-implemented method of claim 9, further comprising:

receiving a first non-image metric value from a first device, the first non-image metric value corresponding to a first image;

determining to perform HDR imaging by the first device based at least in part on the first non-image metric value and the model; and sending an indication to the first device to perform HDR imaging.

13. A system comprising:

at least one processor; and a first memory including instructions operable to be executed by the at least one processor to perform a set of actions to configure the system for:

determining a non-image metric;

determining a first training image;

determining a second training image;

determining a first training non-image metric value for the first training image using the non-image metric;

determining a second training non-image metric value for the second training image using the non-image metric;

determining a first training recommendation for the first training image, wherein the first training recommendation comprises a first indication that the first training image is to be processed by high dynamic range (HDR) imaging;

determining a second training recommendation for the second training image, wherein the second training recommendation comprises a second indication that the second training image is to be processed by HDR imaging; and training a model for determining whether to perform HDR imaging for an image, wherein the training is based at least in part on the first training non-image metric value, second training non-image metric value, first training recommendation and second training recommendation.

14. The system of claim 13, wherein the model is a neural network model.

15. The system of claim 13, wherein the non-image metric is one or more of a location, a direction, a device orientation, motion sensor data, time, or date.

16. The system of claim 13, the set of actions further configuring the system for:
    training an inference engine using at least the first training non-image metric value and the second training non-image metric value,
    wherein the training of the model is further based on output from the inference engine.

17. The system of claim 13, the set of actions further configuring the system for:
    receiving a first non-image metric value from a first device, the first non-image metric value corresponding to a first image;
    determining to perform HDR imaging by the first device based at least in part on the first non-image metric value and the model; and
    sending an indication to the first device to perform HDR imaging.

18. The system of claim 13, the set of actions further configuring the system for:
    determining a third image metric, wherein the third image metric is determined based on a first image metric measured by a first hardware configuration type and a second image metric measured by a second hardware configuration type;
    determining a first training metric value for the first training image using the third image metric;
    determining a second training metric value for the second training image using the third image metric;
    wherein the training of the model is further based at least in part on the first training metric value and the second training metric value.

19. The system of claim 18, wherein the first image metric, second image metric, and third image metric are histograms.

20. The system of claim 18, the set of actions further configuring the system for:
    receiving a plurality of first image metric values from a first device of the first hardware configuration type, the plurality of first image metric values corresponding to a first image;
    determining a third image metric value using the plurality of first image metric values;
    determining to perform HDR imaging by the first device based at least in part on the third image metric value and the model; and
    sending an indication to the first device to perform HDR imaging.

* * * * *